United States Patent
Higashide

(10) Patent No.: US 7,636,609 B2
(45) Date of Patent: Dec. 22, 2009

(54) METHOD AND APPARATUS FOR DETECTING ABNORMAL CHARACTERISTIC VALUES CAPABLE OF SUPPRESSING DETECTION OF NORMAL CHARACTERISTIC VALUES

(75) Inventor: Masanobu Higashide, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 455 days.

(21) Appl. No.: 11/372,031

(22) Filed: Mar. 10, 2006

(65) Prior Publication Data

US 2006/0206230 A1     Sep. 14, 2006

(30) Foreign Application Priority Data

Mar. 11, 2005    (JP)   ............................ 2005-068588

(51) Int. Cl.
     *G06F 19/00*      (2006.01)
(52) U.S. Cl. .................................... 700/109
(58) Field of Classification Search .............. 700/51, 700/107, 108, 109, 110, 175, 177; 702/81, 702/82
See application file for complete search history.

(56) References Cited

U.S. PATENT DOCUMENTS

| | | | |
|---|---|---|---|
| 4,060,716 A * | 11/1977 | Pekrul et al. ................. | 702/184 |
| 4,961,898 A | 10/1990 | Bogard et al. | |
| 5,203,188 A | 4/1993 | Osgood et al. ................. | 72/9.4 |
| 6,487,472 B1 * | 11/2002 | Song et al. .................... | 700/121 |
| 6,907,388 B2 * | 6/2005 | Suzuki et al. ................. | 702/188 |
| 2006/0206230 A1 | 9/2006 | Higashide ..................... | 700/121 |
| 2007/0012085 A1 | 1/2007 | Higashide ..................... | 73/1.01 |
| 2007/0156373 A1 * | 7/2007 | Yamashita et al. ........... | 702/182 |

FOREIGN PATENT DOCUMENTS

JP     2001-67109     3/2001

OTHER PUBLICATIONS

United States Office Action dated Oct. 28, 2008 in U.S. Appl. No. 11/378,297.

* cited by examiner

*Primary Examiner*—Albert DeCady
*Assistant Examiner*—Chad Rapp
(74) *Attorney, Agent, or Firm*—McGinn IP Law Group, PLLC

(57) ABSTRACT

In a method for detecting abnormal characteristic values of a plurality of products sequentially manufactured in the same manufacturing line, it is determined whether or not a successive-decrease (or increase) tendency has occurred in a plurality of sequentially-obtained characteristic values of the products. Also, it is determined whether or not at least a last one of the characteristic values is located within a control region narrower than an allowable region and outside a normal region narrower than the control region. Further, when the successive-decrease or increase tendency has occurred and the last characteristic value is located within the control region outside the normal region, an alarm state is detected.

20 Claims, 16 Drawing Sheets

METHOD AND APPARATUS FOR DETECTING ABNORMAL CHARACTERISTIC VALUES CAPABLE OF SUPPRESSING DETECTION OF NORMAL CHARACTERISTIC VALUES

BACKGROUND OF THE INVENTION

1. Field of the Invention

The present invention relates to a method and apparatus for detecting abnormal characteristic values of a plurality of products or lots sequentially manufactured in the same manufacturing line.

2. Description of the Related Art

In a first prior art abnormal characteristic value detecting method (see: JP-2001-67109-A), measured characteristic values depending upon lot numbers manufactured in the same manufacturing line have to fall within an allowable region. That is, when a measured characteristic value is outside the allowable region, a respective lot of this measured characteristic value is deemed to be defective, so that the respective lot is scrapped. Also, in order to decrease the number of scrapped lots, measured characteristic values are controlled to fall within a control region narrower than the allowable region. That is, when a measured characteristic value is within the allowable region but outside the control region, i.e., within an alarm region, an alarm signal is generated to carry out a countermeasure operation. Such a measured characteristic value is called an abnormal characteristic value. This will be explained later in detail.

In the above-described first prior art abnormal characteristic value detecting method, however, even if a successive-increase (or decrease) tendency is generated in the measured characteristic values, no alarm signal is generated so that a measured characteristic value would be outside the allowable region due to the delay of an advance countermeasure operation.

In a second prior art abnormal characteristic value detecting method, if a certain successive-decrease (or increase) tendency is generated even within the control region, an alarm signal is generated to prevent other measured characteristic values from being outside the allowable region. Even in this case, the last measured characteristic value of the tendency is called an abnormal characteristic value. This also will be explained later in detail.

SUMMARY OF THE INVENTION

In the above-described second prior art abnormal characteristic value detecting method, however, even if measured characteristic values have a successive-decrease (or increase) tendency stably around a control center value, unnecessary alarm signals are generated to request unnecessary countermeasure operations.

For example, in a chemical vapor deposition (CVD) apparatus, a sputtering apparatus or a dry etching apparatus, by-products are deposited in a reaction chamber according to the numbers of manufactured lots, so that their measured (i.e., sequentially-obtained) characteristic values have a successive-increase tendency with their increase amounts being very small. Even in this case, alarm signals are generated to request unnecessary countermeasure operations.

According to the present invention, in a method for detecting abnormal characteristic values of a plurality of products sequentially manufactured in the same manufacturing line, it is determined whether or not a successive-decrease (or increase) tendency has occurred in a plurality of sequentially-obtained characteristic values of the products. Also, it is determined whether or not at least a last one of the characteristic values is located within a control region narrower than an allowable region and outside a normal region narrower than the control region. Further, when the successive-decrease (or increase) tendency has occurred and the last characteristic value is located within the control region outside the normal region, an alarm state is detected.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENT

Before the description of the preferred embodiment, prior art abnormal characteristic value detecting methods will now be explained with reference to FIGS. 1, 2, 3 and 4.

Figure 1:
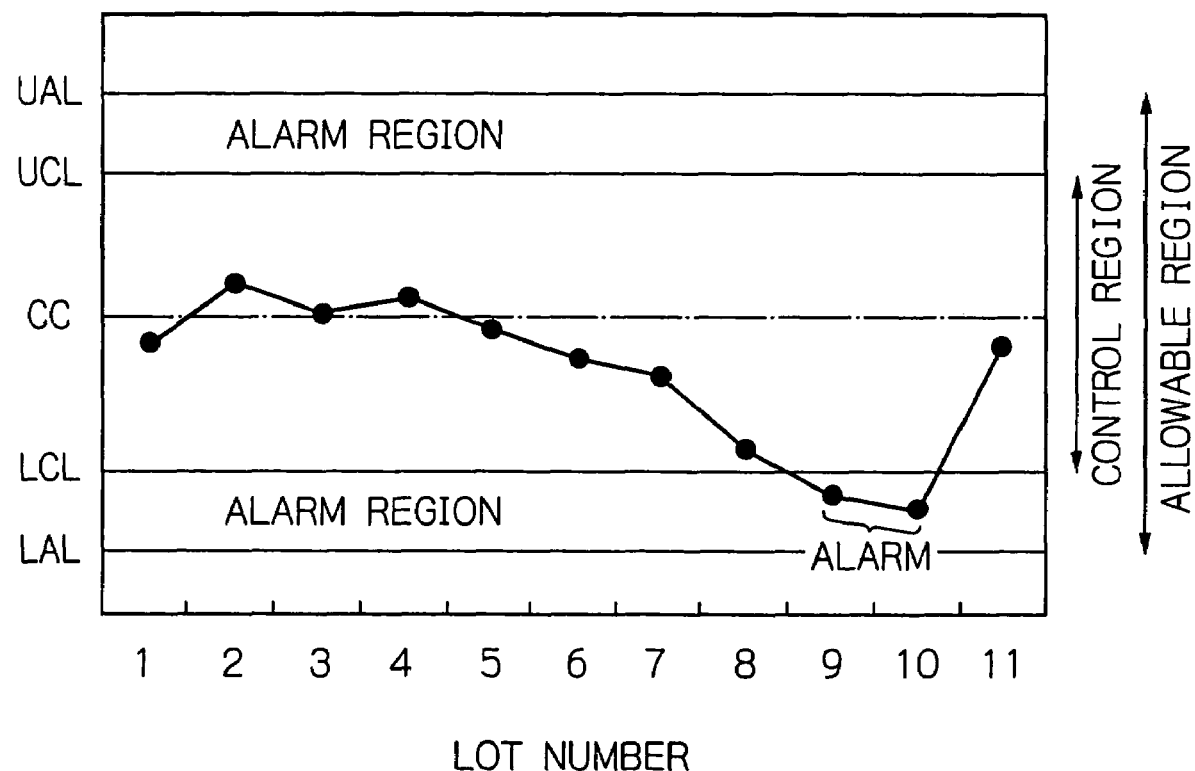
FIG. 1 is a graph for explaining a first prior art abnormal characteristic value detecting method.

In FIG. 1, which is a graph for explaining a first prior art abnormal characteristic value detecting method (see: JP-2001-67109-A), measured characteristic values depending upon sequential numbers such as lot members manufactured in the same manufacturing line have to fall within an allowable region and are controlled to be in a control region narrower than the allowable region.

The allowable region is defined by a lower allowable limit value LAL and an upper allowable limit value UAL (>LAL) centered at a control center value (or an aimed value) CC. Also, the control region is included in the allowable region and is defined by a lower control limit value LCL (>LAL) and an upper control limit value UCL (<UAL) centered at the control center value CC. In this case, an alarm region is defined by the lower allowable limit value LAL and the lower control limit value LCL, and another alarm region is defined by the upper allowable limit value UAL and the upper control limit value UCL.

When a measured characteristic value is outside the allowable region, a respective lot of this measured characteristic value is deemed to be defective, so that a defect signal is generated.

When a measured characteristic value is within the allowable region but outside the control region, i.e., within one of the alarm regions, alarm signals are generated for the lots 9 and 10 as shown in FIG. 1 to carry out an advance countermeasure operation.

When a measured characteristic value is within the control region, a respective lot of this measured characteristic value is deemed to be normal, so that no defect signal and no alarm signal are generated.

Figure 2:
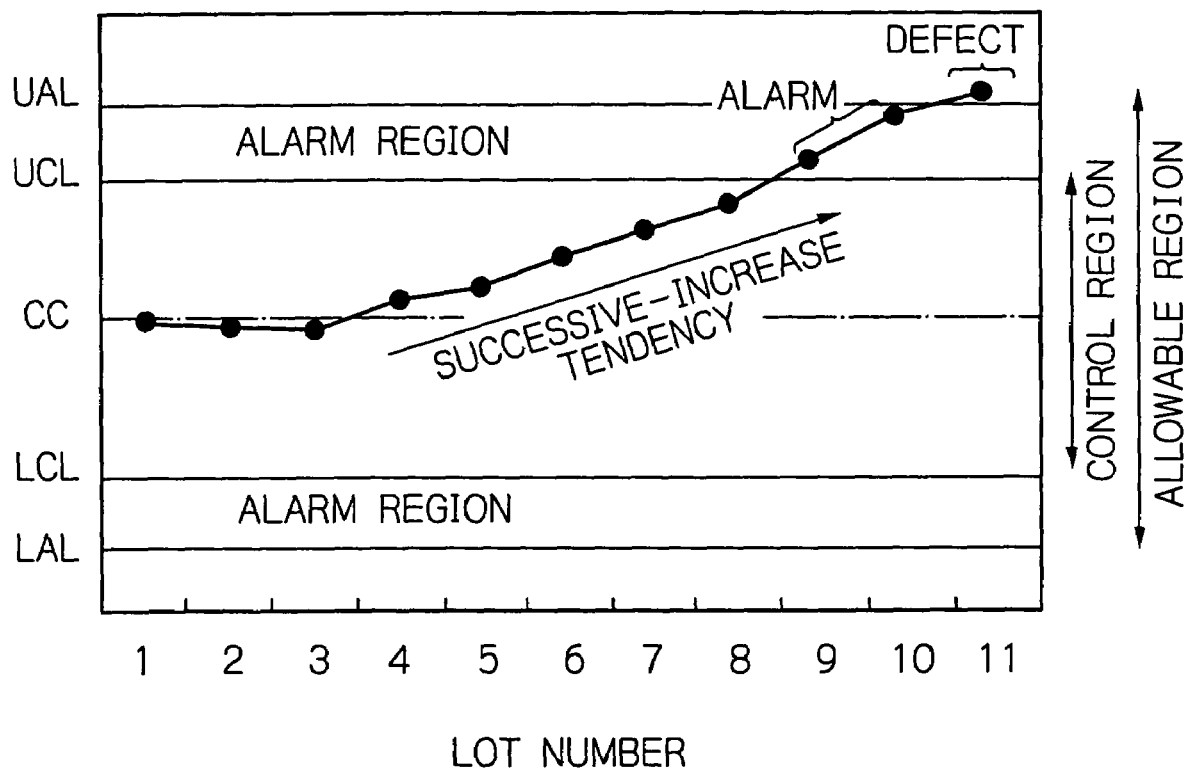
FIG. 2 is a graph for explaining the problem in the first prior art abnormal characteristic value detecting method of FIG. 1.

In the first prior art abnormal characteristic value detecting method of FIG. 1, however, even if a successive-increase tendency is generated in the measured characteristic values of the lots 3, 4, . . . , 8 as shown in FIG. 2, no alarm signal is generated for the lot 8, although alarm signals are generated only for the lots 9 and 10 in the alarm region. As a result, an advance countermeasure operation is delayed due to the delay of the generation of the alarm signals, so that the measured characteristic value of the lot 11 would be outside the allowable region so that the lot 11 is deemed to be defective as shown in FIG. 2.

Figure 3:
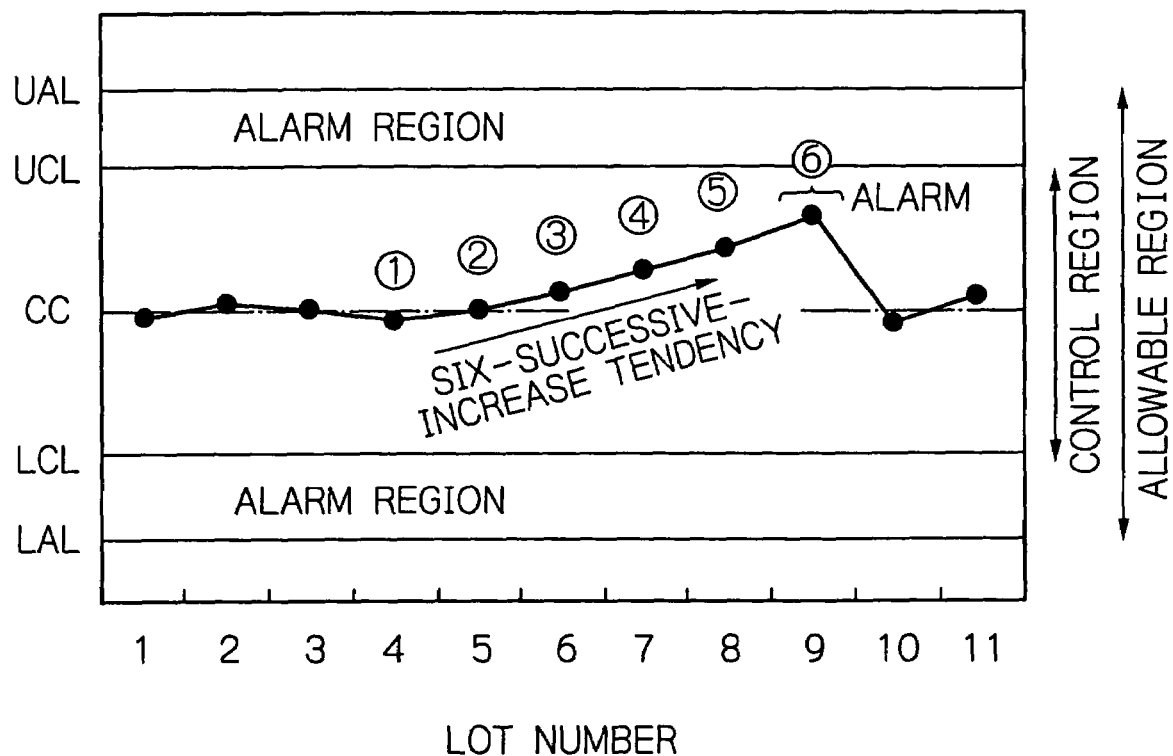
FIG. 3 is a graph for explaining a second prior art abnormal characteristic value detecting method.

In FIG. 3, which is a graph for explaining a second prior art abnormal characteristic value detecting method, if a "six-successive-increase tendency" is generated even within the control region, an alarm signal is generated at the last lot thereof to suppress the delay of generation of alarm signals. That is, if the measured characteristic values of the six successive lots 4, 5, . . . , 9 are successively increased, an alarm signal is generated for the last lot 9. Note that "six" of the six-successive-increase tendency is defined by Japanese Industrial Standards (JIS) Z9021. As a result, a countermeasure operation is carried out to prevent the measured characteristic values of the lots 10 and 11 from being outside the allowable region.

Figure 4:
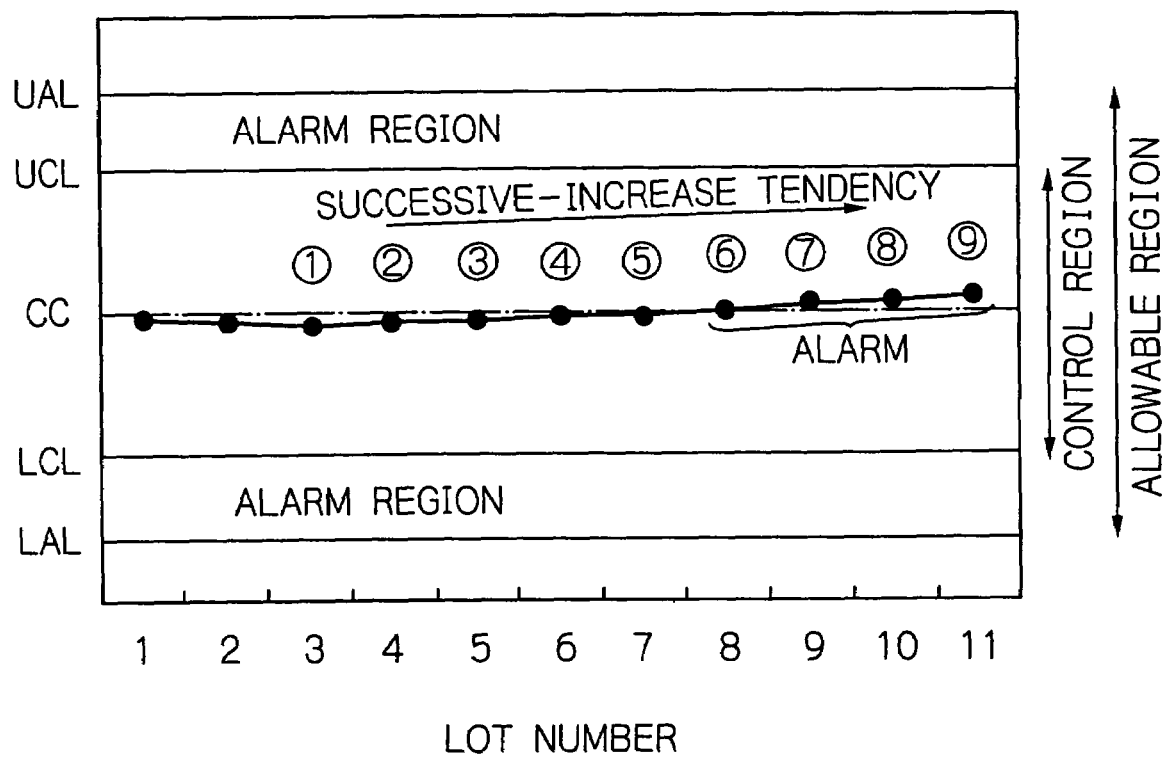
FIG. 4 is a graph for explaining the problem in the second prior art abnormal characteristic value detecting method of FIG. 3.

In the second prior art abnormal characteristic value detecting method of FIG. 3, however, even if the measured characteristic values of the lots 3, 4, . . . , 11 have a successive-increase tendency stably around the control center value CC as shown in FIG. 4, unnecessary alarm signals are generated for the lots 8, 9, 10 and 11 as shown in FIG. 4, to request unnecessary countermeasure operations.

Figure 5:
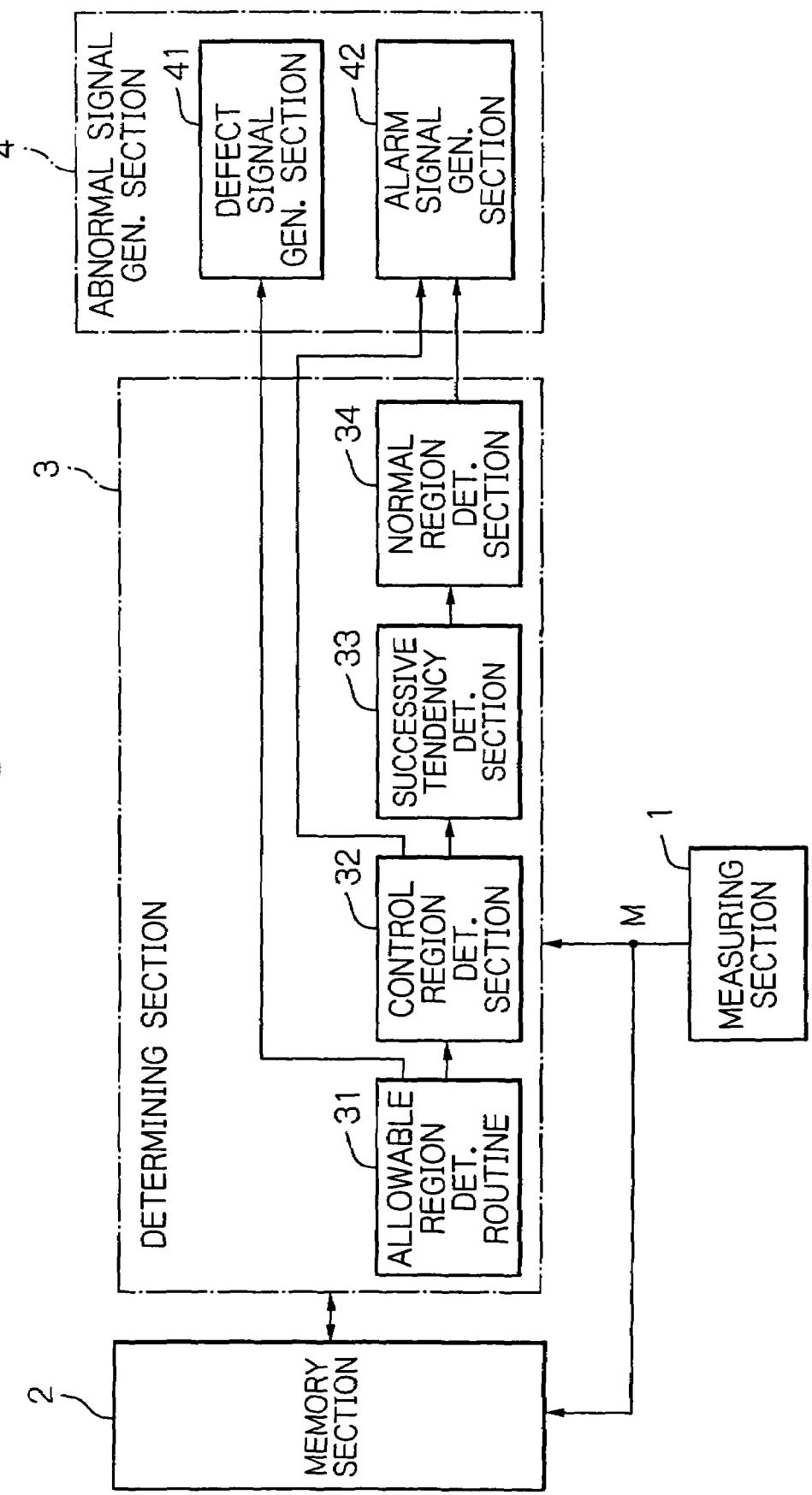
FIG. 5 is a block circuit diagram illustrating an embodiment of the abnormal characteristic value detecting apparatus according to the present invention.

In FIG. 5, which illustrates an embodiment of the abnormal characteristic value detecting apparatus according to the present invention, a measuring section 1 such as an ellipsometer measures a characteristic value such as a thickness of silicon oxide formed on a semiconductor substrate. The measuring section 1 can measure the characteristic values of semiconductor wafers of all lots or selected lots.

A memory section 2 stores not only measured characteristic values and other temporary data, but also constants and programs.

A determining section 3 is constructed by an allowable region determining section 31, a control region determining section 32, a successive tendency determining section 33 and a normal region determining section 34.

Figure 6:
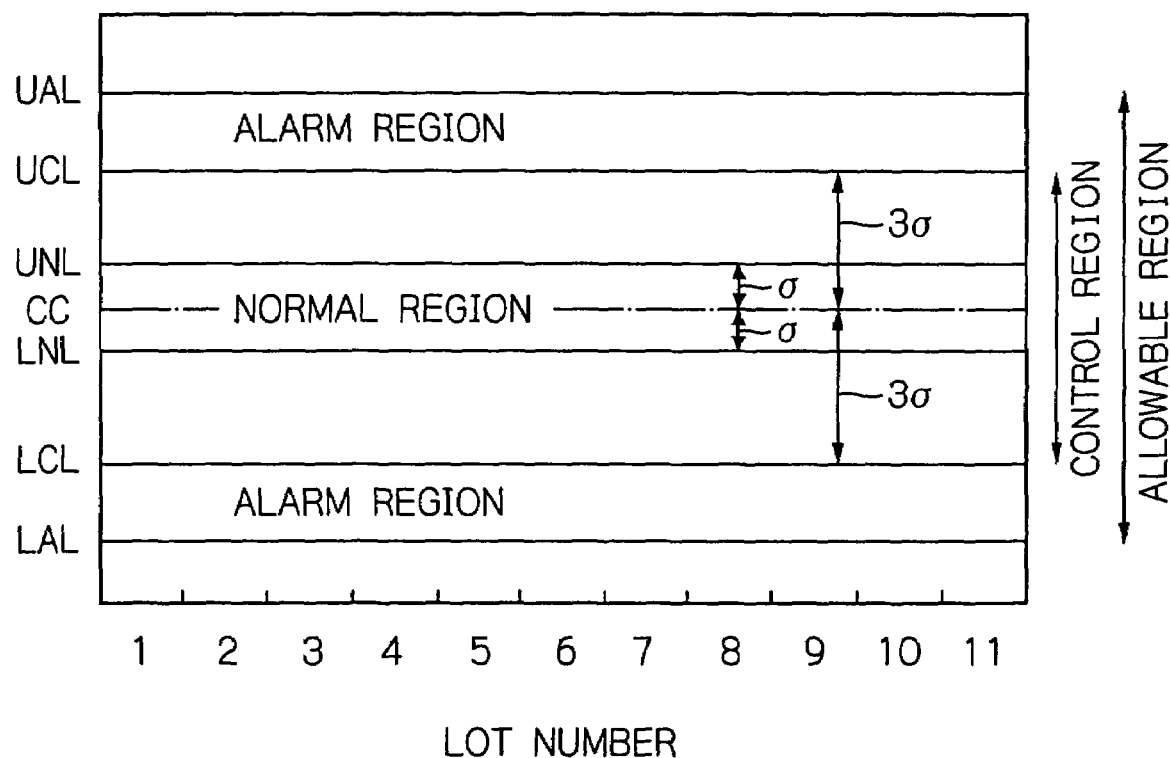
FIG. 6 is a graph for explaining the allowable region, the control region and the normal region of FIG. 5.

The allowable region determining section 31 determines whether or not a measured characteristic value is located within an allowable region defined by a lower allowable limit value LAL and an upper allowable limit value UAL centered at a control center value CC as shown in FIG. 6.

When the measured characteristic value is located within the allowable region, the control region determining section 32 determines whether or not the measured characteristic value is located within a control region defined by a lower control limit value LCL and an upper control limit value UCL centered at the control center value CC as shown in FIG. 6. In this case, $$LAL < LCL < CC$$

$$CC < UCL < UAL$$

When the measured characteristic value is located within the control region, the successive tendency determining section 33 determines whether or not there is a six-successive-decrease (or increase) tendency in the measured characteristic values.

When there is a six-successive-increase (or decrease) tendency in the measured characteristic values, the normal region determining section 34 determines whether or not the measured characteristic value is located within a normal region defined by a lower normal limit value LNL and an upper normal limit value UNL as shown in FIG. 6. In this case, $$LCL < LNL < CC$$

$$CC < UNL < UCL$$

An abnormal signal generating section 4 is constructed by a defect signal generating section 41 and an alarm signal generating section 42.

When the currently-measured or last characteristic value is determined to be located outside the allowable region, the defect signal generating section 41 generates a defect signal adapted to activate a first sound element or a first visual element (not shown).

When the currently-measured or last characteristic value is determined to be located within the allowable region but outside the control region, and within the control region but outside the normal region when a six-successive-decrease (or increase) tendency occurs, the alarm signal generating section 42 generates an alarm signal adapted to activate a second sound element or a second visual element (not shown).

In FIG. 6, note that $$CC-LCL=UCL-CC=3\sigma$$

$$CC-LNL=UNL-CC=\sigma$$

where $\sigma$ is a standard deviation of the measured characteristic values if they have a normal distribution within the allowable region.

Figure 7:
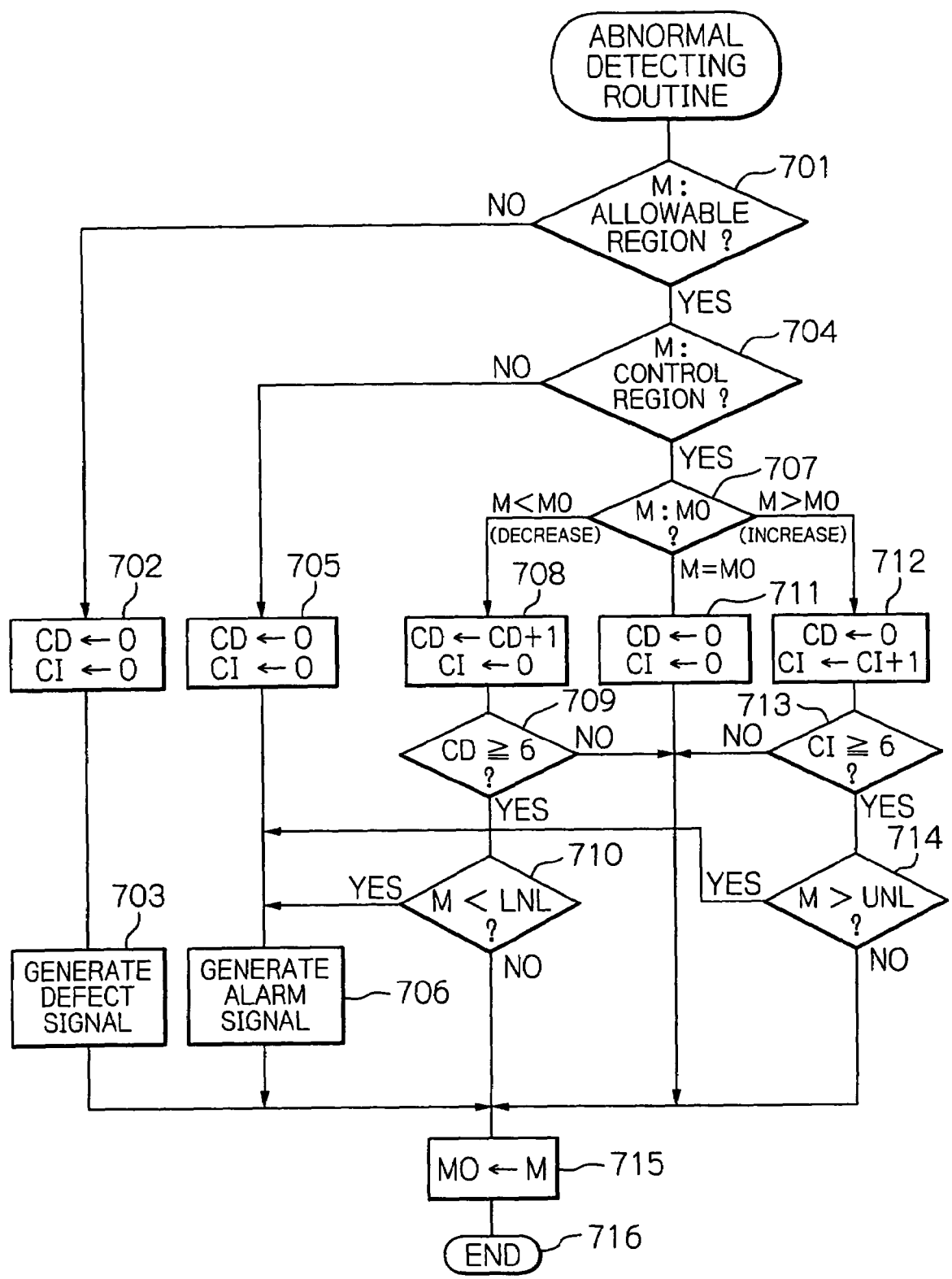
FIG. 7 is a flowchart for explaining a first operation of the abnormal characteristic value detecting apparatus of FIG. 5.

The memory section 2, the determining section 3 and the abnormal signal generating section 4 of FIG. 5 are constructed by a computer formed of a central processing unit (CPU), a random access memory (RAM) for storing the measured characteristic values and other temporary data, a read-only memory (ROM) for storing constants and programs, and so on. In this case, the operation of the CPU is carried out by a flowchart as illustrated in FIG. 7. In FIG. 7, an initial routine (not shown) is carried out in advance, so that a decrease counter value CD and an increase counter value CI are initialized at 0, and a previously-measured characteristic value M0 is initialized at the center control value CC. Note that the routine of FIG. 7 is carried out every time the measuring section 1 generates a measured characteristic value fetch request signal to be sent to the computer.

First, at step 701, it is determined whether or not the measured characteristic value M is within the allowable region, i.e.,

LAL<M<UAL.

As a result, when the measured characteristic value M is not within the allowable region (M≦LAL or M≧UAL), the control proceeds to steps 702 and 703. That is, at step 702, the counter values CD and CI are reset (CD=CI=0). Also, at step 703, a defect signal is generated. As a result, a respective lot of this measured characteristic value is deemed to be defective.

On the other hand, at step 701, when it is determined that the measured characteristic value M is within the allowable region (LAL<M<UAL), the control proceeds to step 704 which determines whether or not the measured characteristic value M is within the control region, i.e.,

LCL<M<UCL.

As a result, when the measured characteristic value M is not within the control region (M≦LCL or M≧UCL), the control proceeds to steps 705 and 706. That is, at step 705, the counter values CD and CI are reset (CD=CI=0). Also, at step 706, an alarm signal is generated. As a result, a countermeasure operation would be carried out.

On the other hand, at step 704, when it is determined that the measured characteristic value M is within the control region (LCL<M<UCL), the control proceeds to step 707 which determines whether or not the measured characteristic value M is smaller than M0, equal to M0, or larger than M0. As a result, when M<M0 (decrease state), the control proceeds to steps 708, 709 and 710. Also, when M=M0, the control proceeds to step 711 which resets the counter values CD and CI. Further, when M<M0 (increase state), the control proceeds to steps 712, 713 and 714.

At step 708, the decrease counter value CD is counted up by 1, i.e., CD=CD+1, while the increase counter value CI is reset, i.e., CI=0. Then, at step 709, it is determined whether or not CD≧6, i.e., a six-successive-decrease tendency occurs in the measured characteristic values. Only when CD≧6, does the control proceed to step 710 which determines whether or not M<LNL, i.e., the last measured characteristic value M is within the normal region. As a result, only when M<LNL, does the control proceed to step 706 which generates an alarm signal. Thus, when the six or more successive characteristic values are decreased and the last characteristic value is not within the normal region, an alarm signal is generated.

On the other hand, at step 712, the decrease counter value CD is reset, i.e., CD=0, while the increase counter value CI is counted up by 1, i.e., CI=CI+1. Then, at step 713, it is determined whether or not CI≧6, i.e., a six-successive-increase tendency occurs in the measured characteristic values. Only when CI≧6, does the control proceed to step 714 which determines whether or not M>UNL, i.e., the last measured characteristic value M is within the normal region. As a result, only when M>UNL, does the control proceed to step 706 which generates an alarm signal. Thus, when the six or more successive characteristic values are increased and the last characteristic value is not within the normal region, an alarm signal is generated.

The control at steps 703, 706 and 711 proceeds to step 715. Also, when the counter value CD or CI is smaller than 6 at step 709 or 713, the control proceed to step 715. At step 715, the previously-measured characteristic value M0 is replaced by the currently-measured characteristic value M, and proceeds to step 716 which prepares for the next measured characteristic value fetch request signal.

Figure 8:
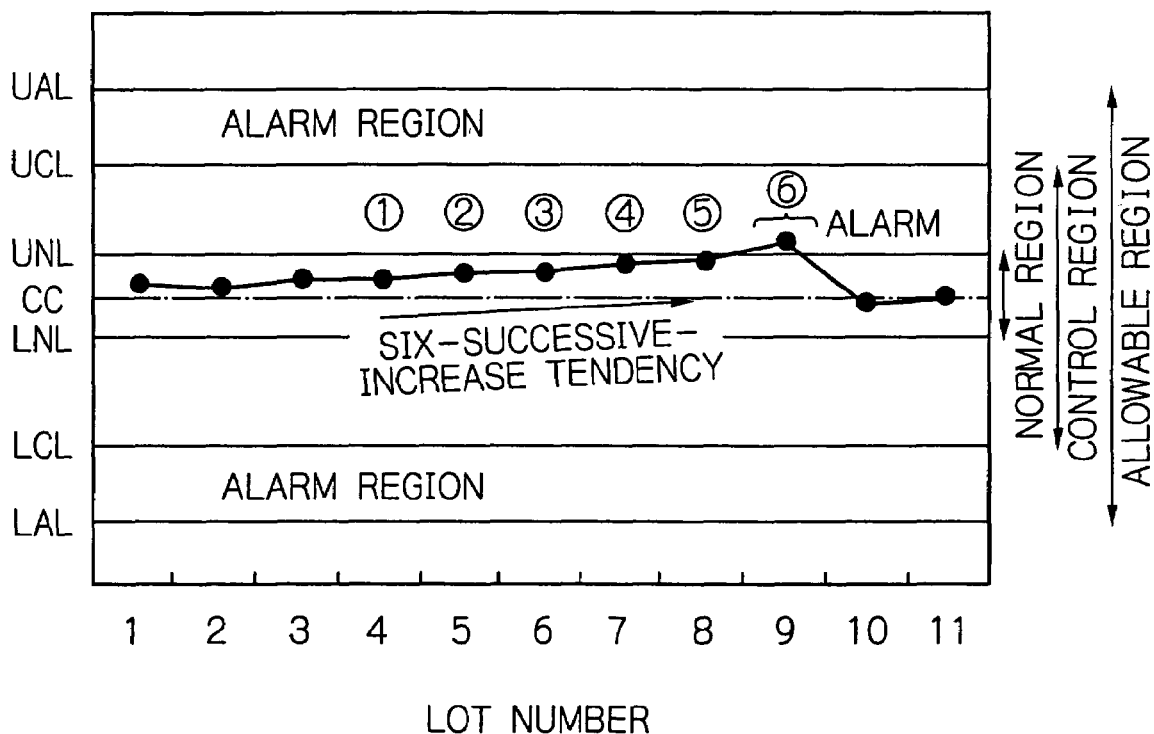
FIGS. 8 and 9 are graphs for explaining the flowchart of FIG. 7.

According to a first example as illustrated in FIG. 8, if a "six-successive-increase tendency" is generated even within the control region, the last measured characteristic value is outside the normal region, so that an alarm signal is generated at the last lot thereof to suppress the delay of generation of alarm signals. That is, if the measured characteristic values of the six successive lots 4, 5, . . . , 9 are successively increased, an alarm signal is generated for the last lot 9. As a result, a countermeasure operation is carried out to prevent the measured characteristic values of the lots 10 and 11 from being outside the allowable region.

Figure 9:
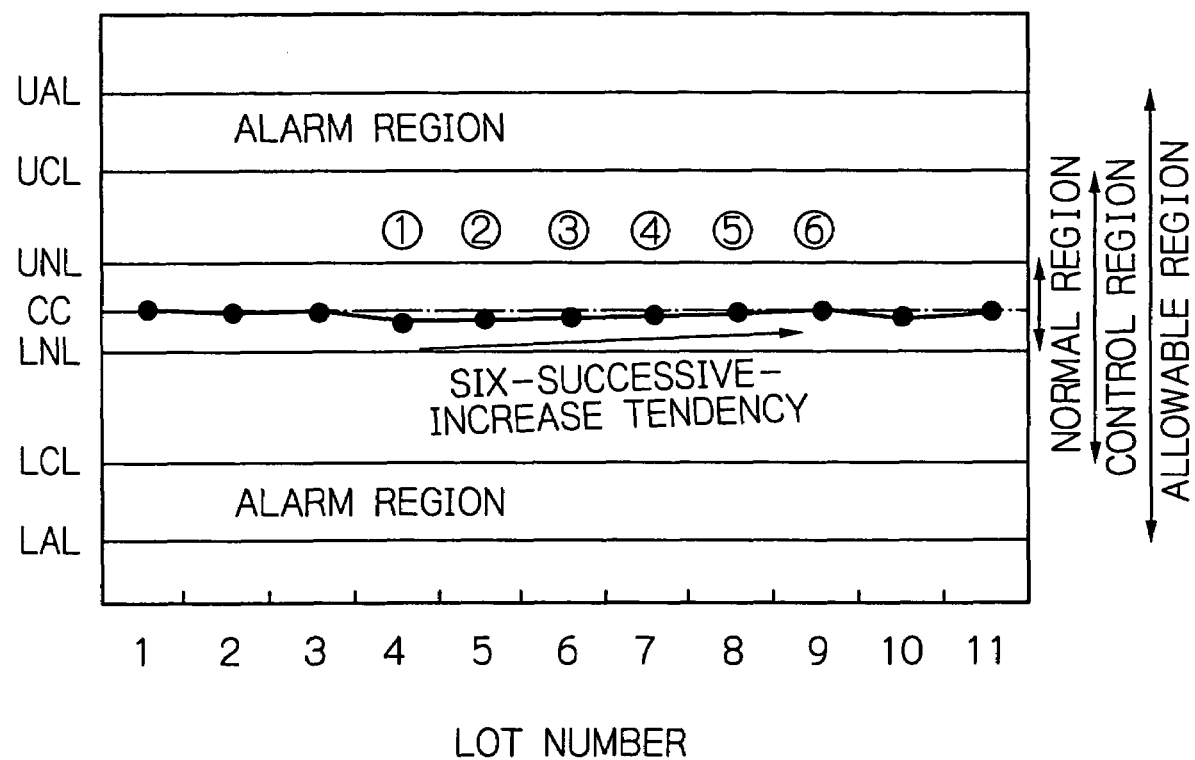

According to a second example as illustrated in FIG. 9, even if the measured characteristic values of the lots 3, 4, . . . , 11 have a successive-increase tendency stably around the control center value CC, unnecessary alarm signals are not generated, so that unnecessary countermeasure operations are not requested.

Figure 10:
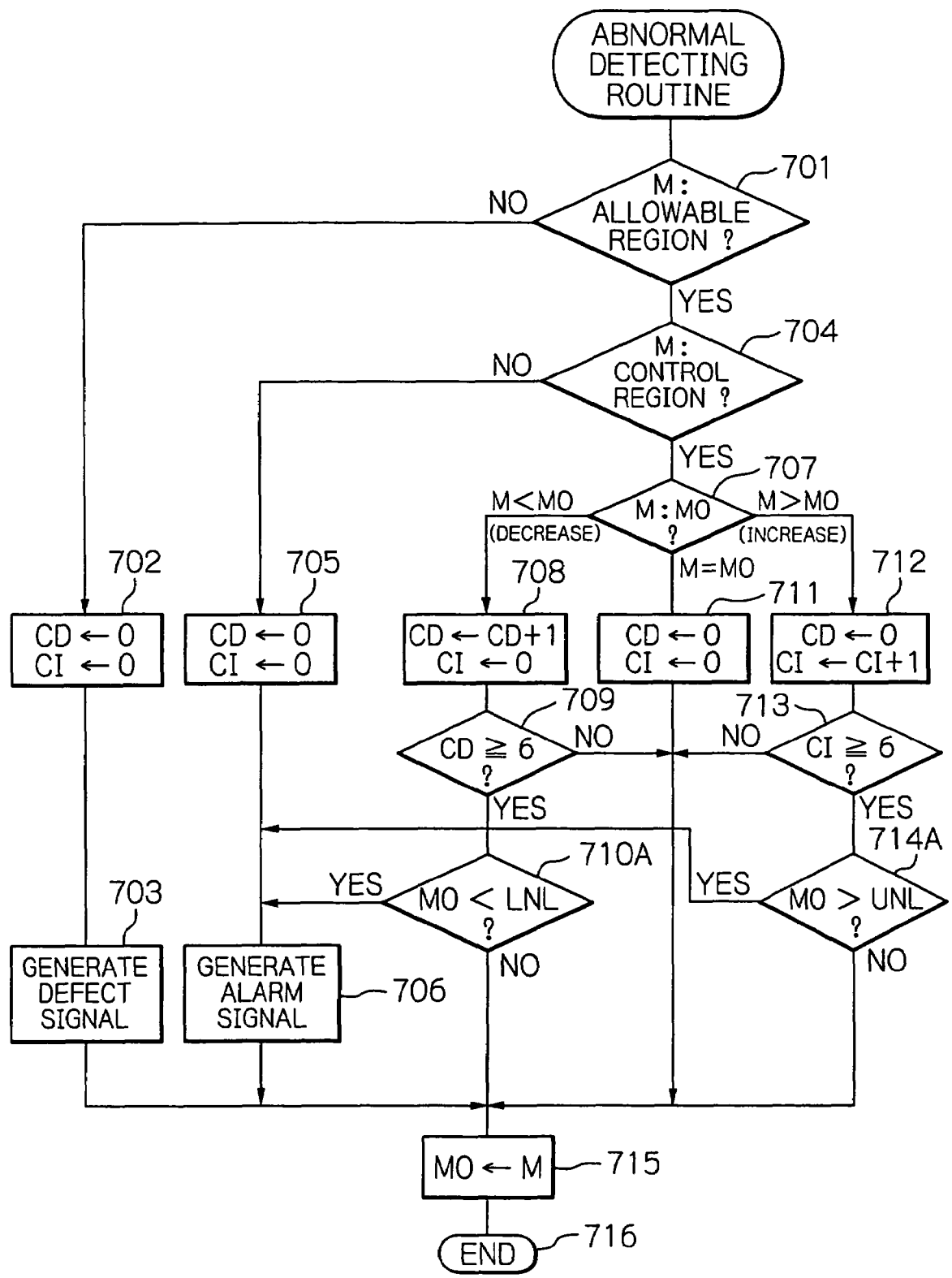
FIG. 10 is a flowchart for explaining a second operation of the abnormal characteristic value detecting apparatus of FIG. 5.

In FIG. 10, which is a modification of the flowchart of FIG. 7, steps 710 and 714 of FIG. 7 are replaced by steps 710A and 714A, respectively.

At step 710A, it is determined whether or not M0<LNL, i.e., the last two measured characteristic values M0 and M are within the control region excluding the normal region. As a result, only when M0<LNL, does the control proceed to step 706 which generates an alarm signal. Thus, when the six or more successive characteristic values are decreased and the last two measured characteristic values are within the control region excluding the normal region, an alarm signal is generated.

At step 714A, it is determined whether or not M0>UNL, i.e., the last two measured characteristic values M0 and M are within the control region excluding the normal region. As a result, only when M0>UNL, does the control proceed to step 706 which generates an alarm signal. Thus, when the six or more successive characteristic values are increased and the last two measured characteristic values are within the control region excluding the normal region, an alarm signal is generated.

Figure 11:
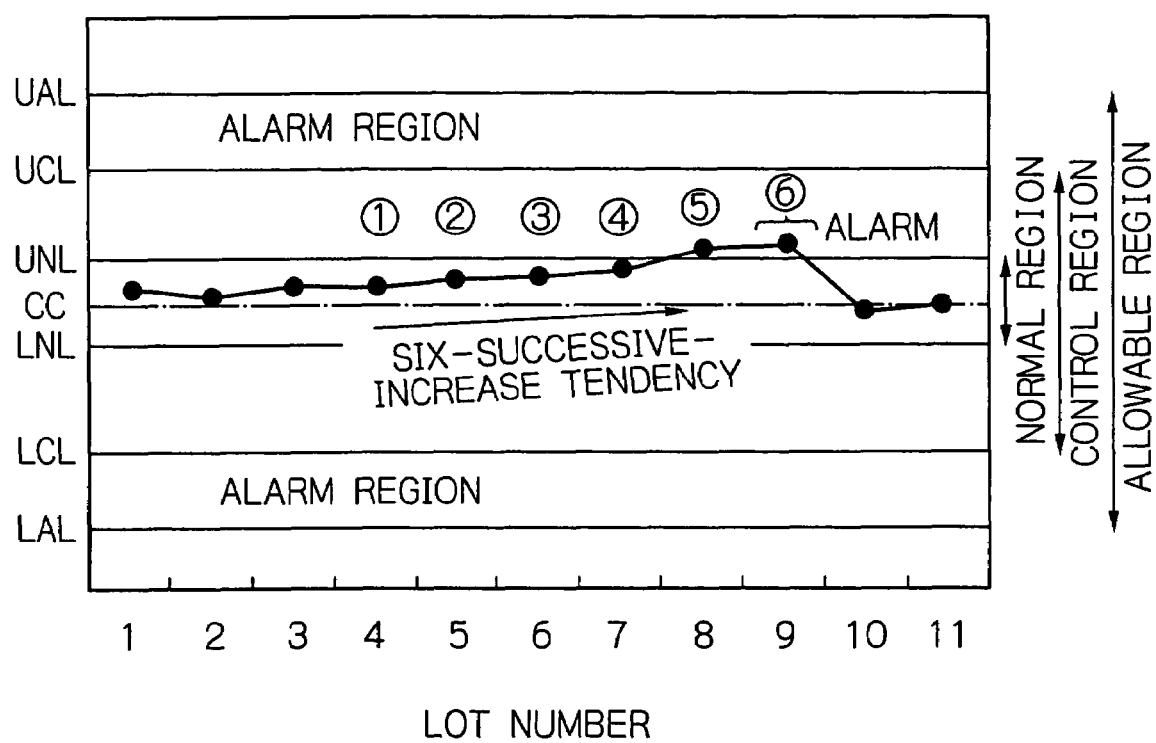
FIG. 11 is a graph for explaining the flowchart of FIG. 10.

According to an example as illustrated in FIG. 11, if a "six-successive-increase tendency" is generated even within the control region, the last two measured characteristic values are outside the normal region, so that an alarm signal is generated at the last lot thereof to suppress the delay of generation of alarm signals. That is, if the measured characteristic values of the six successive lots 4, 5, . . . , 9 are successively increased, an alarm signal is generated for the last lot 9. As a result, a countermeasure operation is carried out to prevent the measured characteristic values of the lots 10 and 11 from being outside the allowable region.

Figure 12:
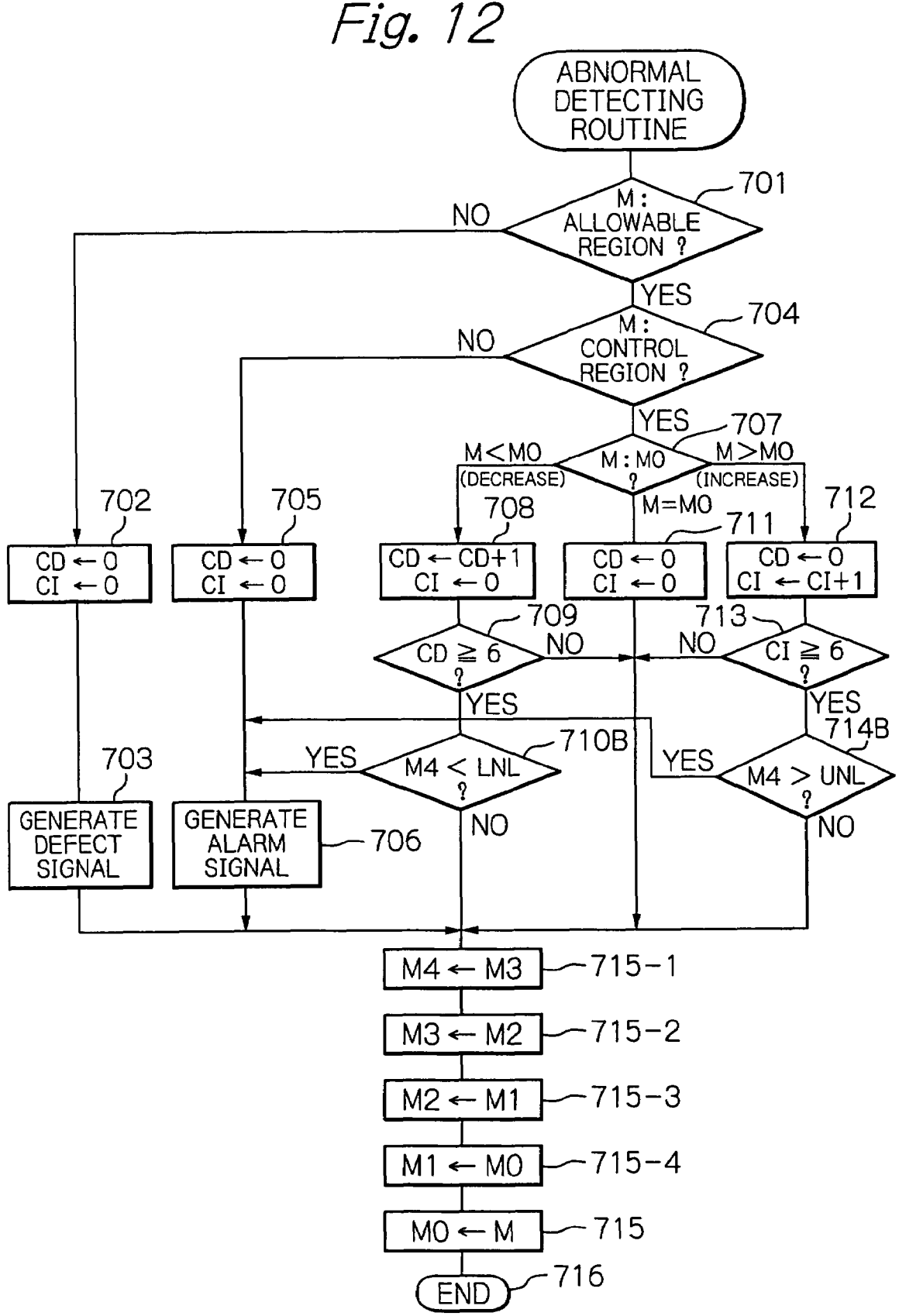
FIG. 12 is a flowchart for explaining a third operation of the abnormal characteristic value detecting apparatus of FIG. 5.

In FIG. 12, which is another modification of the flowchart of FIG. 7, steps 710 and 714 of FIG. 7 are replaced by steps 710B and 714B, respectively, and steps 715-1, 715-2, 715-3 and 715-4 are added before step 715. Note that the values M1, M2, M3 and M4 are initialized by the initial routine (not shown) at the control center value CC.

At step 710B, it is determined whether or not M4<LNL, i.e., the last six measured characteristic values M4, M3, M2, M1, M0 and M are within the control region excluding the normal region. As a result, only when M4<LNL, does the control proceed to step 706 which generates an alarm signal. Thus, when the six or more successive characteristic values are decreased and the last six measured characteristic values are within the control region excluding the normal region, an alarm signal is generated.

At step 714B, it is determined whether or not M4>UNL, i.e., the last six measured characteristic values M4, M3, M2, M1, M0 and M are within the control region excluding the normal region. As a result, only when M4>UNL, does the control proceed to step 706 which generates an alarm signal. Thus, when the six or more successive characteristic values are increased and the last six measured characteristic values are within the control region excluding the normal region, an alarm signal is generated.

At steps 715-1, 715-2, 715-3 and 715-4, the values M4, M3, M2 and M1 are replaced by M3, M2, M1 and M0, respectively, to prepare for the next operation.

Figure 13:
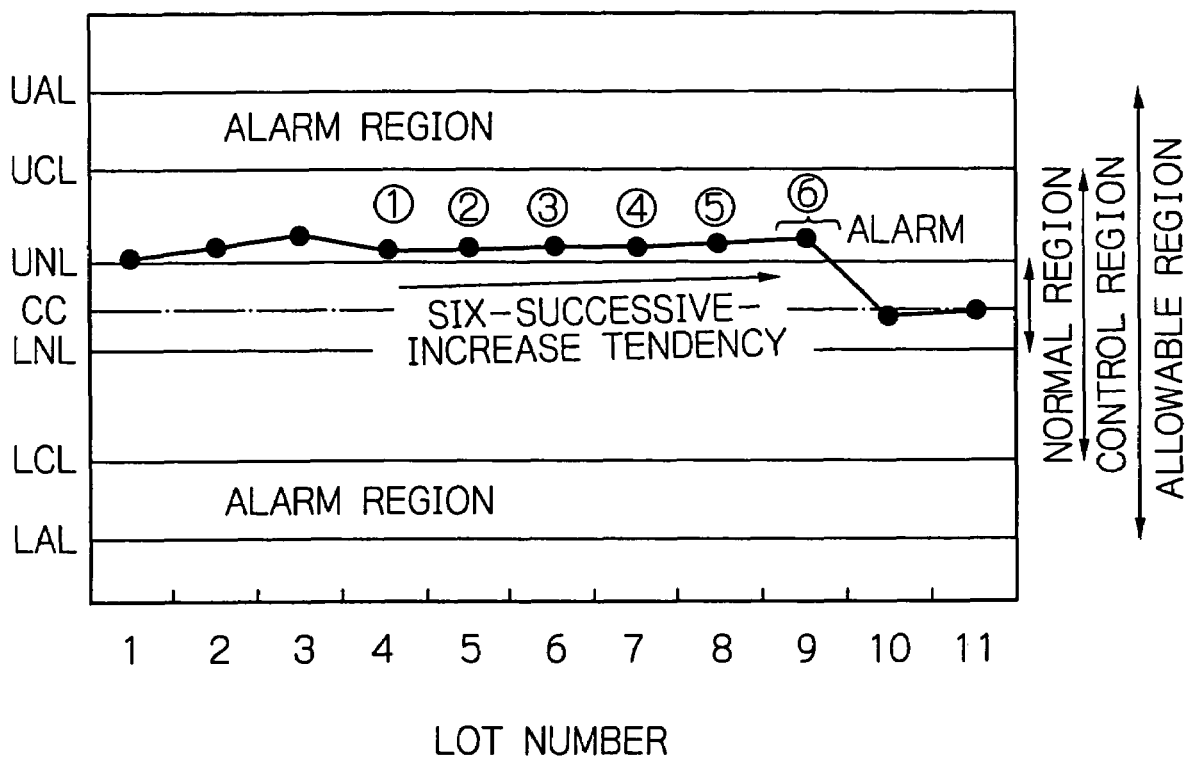
FIG. 13 is a graph for explaining the flowchart of FIG. 12.

According to an example as illustrated in FIG. 13, if a "six-successive-increase tendency" is generated even within the control region, all the six measured characteristic values are outside the normal region, so that an alarm signal is generated at the last lot thereof to suppress the delay of generation of alarm signals. That is, if the measured characteristic values of the six successive lots 4, 5, . . . , 9 are successively increased, an alarm signal is generated for the last lot 9. As a result, a countermeasure operation is carried out to prevent the measured characteristic values of the lots 10 and 11 from being outside the allowable region.

Figure 14:
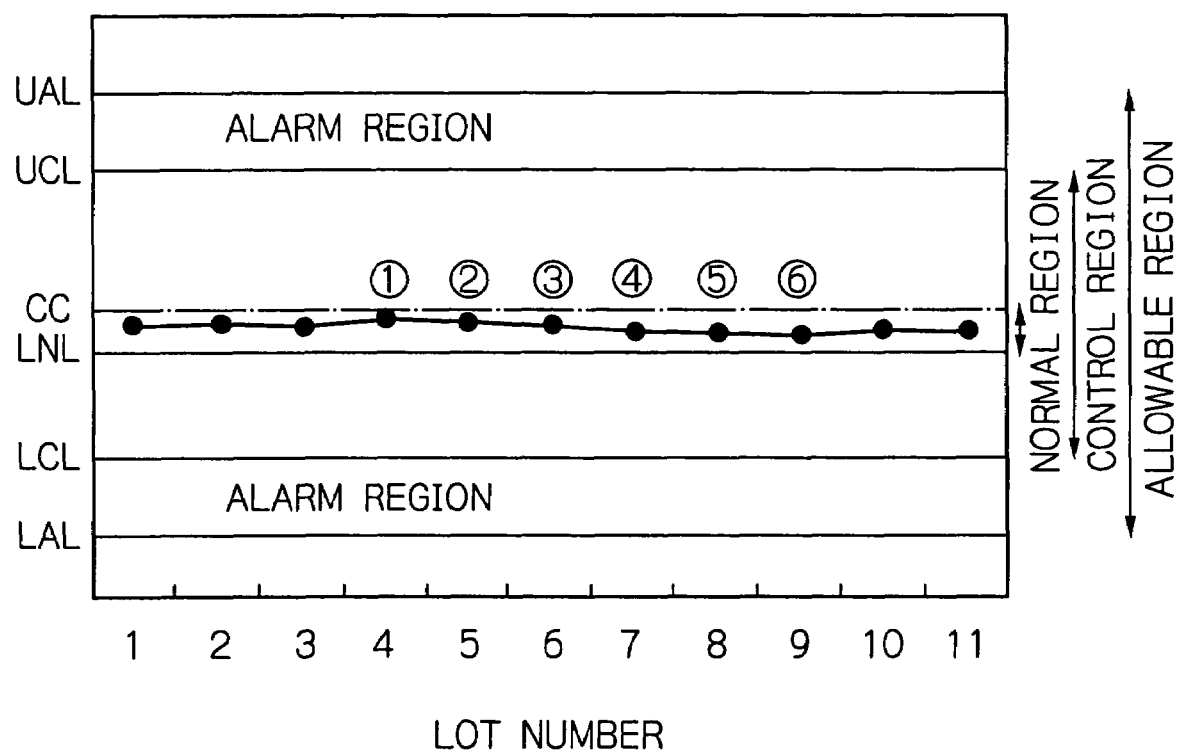
FIGS. 14, 15 and 16 are graphs illustrating modifications of the graph of FIG. 6.
Figure 15:
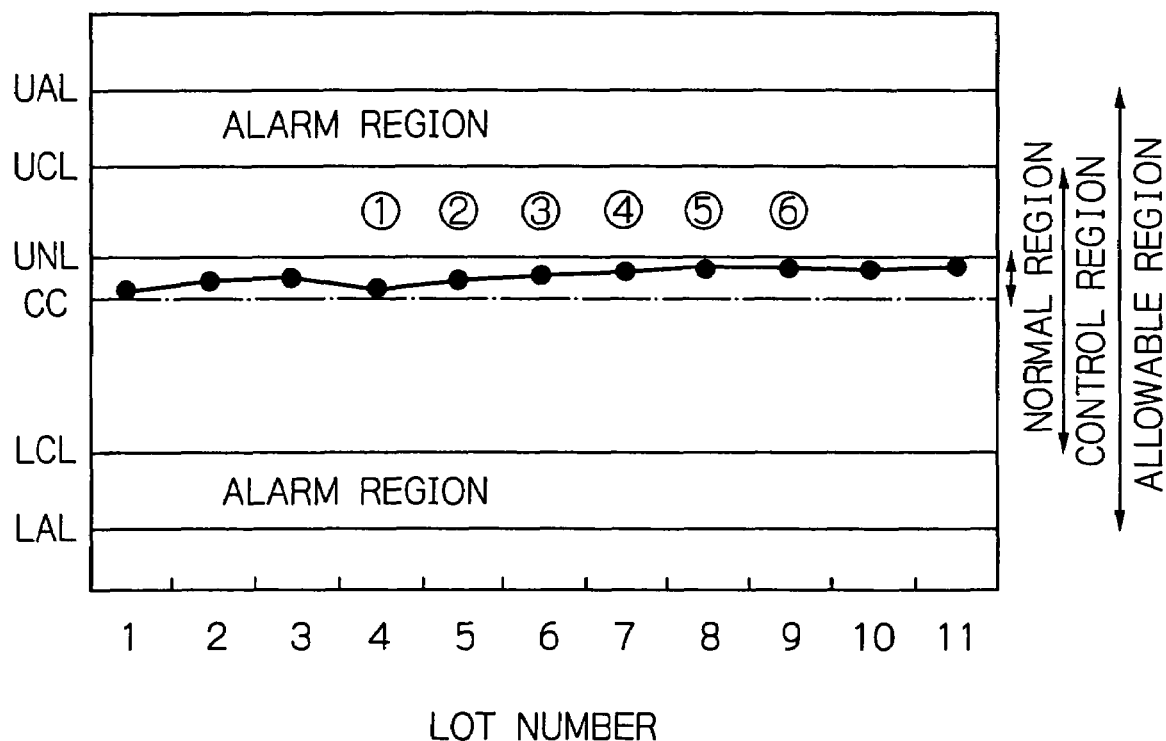

In FIG. 6, the normal region is provided to bridge the control center value CC. However, the normal region can be provided on one side of the control center value CC as illustrated in FIGS. 14 and 15. That is, in FIG. 14, the normal region is provided only below the control center value CC. In this case, the present invention can be applied to only the case where a successive-decrease tendency occurs, i.e., where steps 712, 713 and 714 (714A, 714B) are deleted from FIG. 7 (10, 12) so that the condition of M>M0 at step 707 leads to step 711. Similarly, in FIG. 15, the normal region is provided only above the control center value CC. In this case, the present invention can be applied to only the case where a successive-increase tendency occurs, i.e., where steps 708, 709 and 710 (710A, 710B) are deleted from FIG. 7 (10, 12) so that the condition of M<M0 at step 707 leads to step 711.

Figure 16:
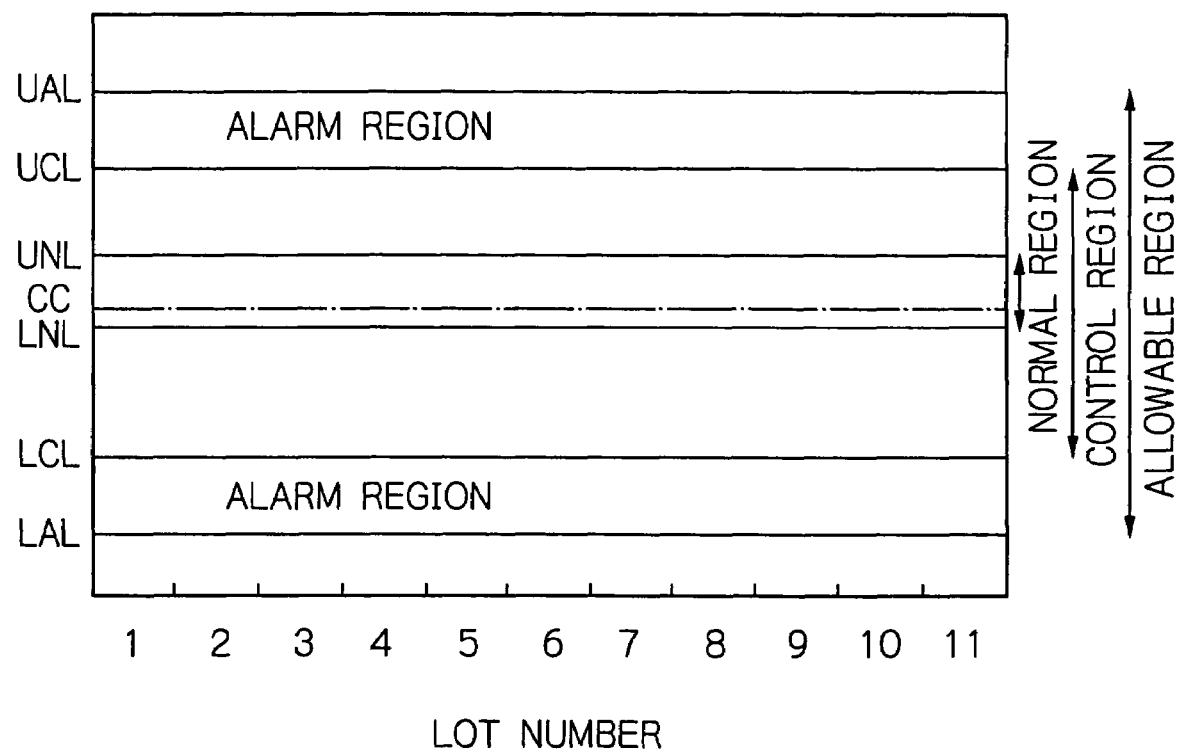

In FIG. 6, the normal region is symmetrical with respect to the control center value CC. However, the normal region can be asymmetrical with respect to the control center value CC as illustrated in FIG. 16. That is, in FIG. 16, the normal region above the control center value CC is wider than the normal region below the control center value CC. As a result, if the measured characteristic values are slightly gradually increased rather than decreased in a normal state, unnecessary alarm signals can be effectively suppressed to decrease unnecessary countermeasure operation requests.

The invention claimed is:

1. A method for detecting abnormal characteristic values of a plurality of products sequentially manufactured in a same manufacturing line, comprising:
   sequentially manufacturing said products;
   determining whether or not a monotonic successive-decrease tendency has occurred in a plurality of sequentially-obtained characteristic values of said products;
   determining whether or not at least a last one of said characteristic values is located within a control region narrower than an allowable region and outside a normal region narrower than said control region; and
   detecting an alarm state when said successive-decrease tendency has occurred and said last characteristic value is located within said control region outside said normal region and adjusting said sequential manufacturing in accord with said detected alarm state when said alarm state is detected.

2. The method as set forth in claim 1, further comprising generating an alarm signal when said alarm state is detected.

3. The method as set forth in claim 1, wherein a lower limit of said normal region is above a lower limit of said control region and below a control center value, and wherein an upper limit of said normal region is above said control center value and below an upper limit of said control region.

4. The method as set forth in claim 3, wherein a difference between the lower limit of said normal region and said control center value is different from a difference between said control center value and the upper limit of said normal region.

5. The method as set forth in claim 1, wherein a lower limit of said normal region is above a lower limit of said control region and below a control center value, and wherein an upper limit of said normal region is the same as said control center value.

6. A method for detecting abnormal characteristic values of a plurality of products sequentially manufactured in a same manufacturing line, comprising:
   sequential manufacturing said products;
   determining whether or not a monotonic successive-increase tendency has occurred in a plurality of sequentially-obtained characteristic values of said products;
   determining whether or not at least a last one of said characteristic values is located within a control region narrower than an allowable region and outside a normal region narrower than said control region; and
   detecting an alarm state when said successive-increase tendency has occurred and said last characteristic value is located within said control region outside said normal region and adjusting said sequential manufacturing in accord with said detected alarm state when said alarm state is detected.

7. The method as set forth in claim 6, further comprising generating an alarm signal when said alarm state is detected.

8. The method as set forth in claim 6, wherein a lower limit of said normal region is above a lower limit of said control region and below a control center value, and wherein an upper limit of said normal region is above said control center value and below an upper limit of said control region.

9. The method as set forth in claim 8, wherein a difference between the lower limit of said normal region and said control center value is different from a difference between said control center value and the upper limit of said normal region.

10. The method as set forth in claim 6, wherein a lower limit of said normal region is the same as said control center value, and wherein an upper limit of said normal region is above said control center value and lower than an upper limit of said control region.

11. An apparatus for detecting abnormal characteristic values of a plurality of products sequentially manufactured in a same manufacturing line, comprising:
   a memory section storing a plurality of sequentially-obtained characteristic values of said products;
   a successive-decrease tendency determining section, executed by a processor, for determining whether or not a monotonic successive-decrease tendency has occurred in said plurality of sequentially-obtained characteristic values of said products; and
   a normal region determining section, executed by said processor, for determining whether or not at least a last one of said characteristic values is located within a control region narrower than an allowable region and outside a normal region narrower than said control region, thus detecting an alarm state when said successive-decrease tendency has occurred and said last characteristic value is located within said control region outside said normal region.

12. The apparatus as set forth in claim 11, further comprising an alarm generating section for generating an alarm signal when said alarm state is detected.

13. The apparatus as set forth in claim 11, wherein a lower limit of said normal region is above a lower limit of said control region and below a control center value, and wherein an upper limit of said normal region is above said control center value and below an upper limit of said control region.

14. The apparatus as set forth in claim 13, wherein a difference between the lower limit of said normal region and said control center value is different from a difference between said control center value and the upper limit of said normal region.

15. The apparatus as set forth in claim 11, wherein a lower limit of said normal region is above a lower limit of said control region and below a control center value, and wherein an upper limit of said normal region is the same as said control center value.

16. An apparatus for detecting abnormal characteristic values of a plurality of products sequentially manufactured in a same manufacturing line, comprising:
   a memory section storing a plurality of sequentially-obtained characteristic values of said products;
   a successive-increase tendency determining section, executed by a processor, for determining whether or not a monotonic successive-increase tendency has occurred in said plurality of sequentially-obtained characteristic values of said products; and
   a normal region determining section, executed by said processor, for determining whether or not at least a last one of said characteristic values is located within a control region narrower than an allowable region and outside a normal region narrower than said control region, thus detecting an alarm state when said successive-increase tendency has occurred and said last characteristic value is located within said control region outside said normal region.

17. The apparatus as set forth in claim 16, further comprising an alarm generating section for generating an alarm signal when said alarm state is detected.

18. The apparatus as set forth in claim 16, wherein a lower limit of said normal region is above a lower limit of said control region and below a control center value, and wherein an upper limit of said normal region is above said control center value and below an upper limit of said control region.

19. The apparatus as set forth in claim 18, wherein a difference between the lower limit of said normal region and said control center value is different from a difference between said control center value and the upper limit of said normal region.

20. The apparatus as set forth in claim 16, wherein a lower limit of said normal region is the same as said control center value, and wherein an upper limit of said normal region is above said control center value and lower an upper limit of said control region.

* * * * *